US007014896B1

(12) United States Patent
Miyakawa et al.

(10) Patent No.: US 7,014,896 B1
(45) Date of Patent: Mar. 21, 2006

(54) PACKAGING CONTAINER FOR ELECTRONIC PART

(75) Inventors: Takeshi Miyakawa, Gunma (JP); Mikio Shimizu, Gunma (JP); Yuichi Kadoya, Gunma (JP); Masafumi Hiura, Gunma (JP); Minoru Oda, Gunma (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/030,103

(22) PCT Filed: Nov. 27, 2000

(86) PCT No.: PCT/JP00/08342

§ 371 (c)(1), (2), (4) Date: Jan. 17, 2002

(87) PCT Pub. No.: WO01/40079

PCT Pub. Date: Jun. 7, 2001

(30) Foreign Application Priority Data

Nov. 29, 1999 (JP) ................................ 11/337702

(51) Int. Cl.
*B29D 22/00* (2006.01)
*B29D 23/00* (2006.01)

(52) U.S. Cl. ...................... 428/35.7; 428/347; 428/412

(58) Field of Classification Search ............... 428/35.7, 428/347, 412

See application file for complete search history.

(56) References Cited

U.S. PATENT DOCUMENTS

| | | | | |
|---|---|---|---|---|
| 5,208,103 | A * | 5/1993 | Miyamoto et al. | 428/354 |
| 5,857,572 | A * | 1/1999 | Bird et al. | 206/713 |

FOREIGN PATENT DOCUMENTS

| | | | |
|---|---|---|---|
| EP | 0 909 641 A1 | | 4/1999 |
| JP | 05294376 A | * | 11/1993 |
| JP | 11-77938 | | 3/1999 |
| JP | KOKAI 11-77938 | * | 3/1999 |
| JP | 11-147569 | * | 6/1999 |
| JP | 2000-7021 | | 1/2000 |

OTHER PUBLICATIONS

U.S. Appl. No. 10/030,103, filed Jan. 17, 2002, Miyakawa et al.

U.S. Appl. No. 10/495,656, filed May 17, 2004, Miyakawa et al.

* cited by examiner

*Primary Examiner*—Michael C. Miggins
(74) *Attorney, Agent, or Firm*—Oblon, Spivak, McClelland, Maier & Neustadt, P.C.

(57) ABSTRACT

An electronic component packaging container which comprises a multilayer polyester sheet having a base layer comprising a polyethylene terephthalate type resin and a polycarbonate type resin and a surface layer comprising a polycarbonate type resin, formed on at least one side of the base layer, wherein the base layer contains from 70 to 97 wt % of the polyethylene terephthalate type resin and from 3 to 30 wt % of the polycarbonate type resin based on the total amount of the polyethylene terephthalate type resin and the polycarbonate type resin, and the thickness of the surface layer is from 10 to 30% of the total thickness.

11 Claims, No Drawings

PACKAGING CONTAINER FOR ELECTRONIC PART

TECHNICAL FIELD

The present invention relates to an electronic component packaging container and a sheet useful therefor.

BACKGROUND ART

As a material for an electronic component packaging container such as a tray or a carrier tape, a polyvinyl chloride (PVC) resin, a polyethylene terephthalate (PET) resin, a styrene type copolymer resin, a polycarbonate type resin or the like may be used depending upon their properties. Among carrier tapes, particularly for applications for storing electronic components sensitive to static electricity, classified into semiconductors such as IC, antistatic properties are required to protect the electronic components against static electricity, and resins having carbon black incorporated into the above-described resins are used.

Electrical components have further been miniaturized, and it has been attempted to mount electronic components at a higher speed, and accordingly as electronic component packaging containers ones having more excellent mechanical strength have been required. The present invention is to provide an electronic component packaging container to accomplish such objects.

DISCLOSURE OF THE INVENTION

Namely, the present invention resides in an electronic component packaging container which uses a multilayer polyester sheet having a base layer comprising a polyethylene terephthalate type resin and a polycarbonate type resin, and a surface layer comprising a polycarbonate type resin formed on at least one side of the base layer. A sheet having such a construction has been reported to be useful for food applications, particularly as packaging containers and cap materials for prepared food to be heated or defrosted by e.g. a microwave oven, in JP-A-11-77938, but surprisingly, it is particularly useful also as an electronic component packaging container.

BEST MODE FOR CARRYING OUT THE INVENTION

Now, the present invention will be explained in detail.

The electronic component packaging container of the present invention is one comprising a multilayer polyester sheet having a base layer comprising a polyethylene terephthalate type resin and a polycarbonate type resin, and a surface layer comprising a polycarbonate type resin, formed on at least one side of the base layer.

The base layer contains a polyethylene terephthalate type resin and a polycarbonate type resin. It preferably contains from 70 to 97 wt % of a polyethylene terephthalate type resin and from 3 to 30 wt % of a polycarbonate type resin based on the total amount of the polyethylene terephthalate type resin and the polycarbonate type resin. If the compounding ratio of the polycarbonate type resin is low, impact resistance at a low temperature tends to decrease, and if it is high, transparency tends to decrease and cloudiness tends to increase. Transparency is necessary in a case where the state of an electronic component such as IC which is a product to be packaged in the container is visually observed from the outside. The balance between strength and transparency is excellent within a range of the polyethylene terephthalate type resin of from 70 to 97 wt % and the polycarbonate type resin of from 3 to 30 wt %. From the viewpoint of the transparency and the cloudiness, the transparency is preferably at least 85% and the cloudiness is preferably at most 15% in order to visually observe the state of a packaged product from the outside. The state of the electronic component in the container can be visually observed from the outside within these ranges.

The polyethylene terephthalate type resin or more concisely, a polyethylene terephthalate resin may be one obtained mainly from ethylene glycol and terephthalic acid or its dimethyl ester, and in addition, as a copolymerizable monomer, diethylene glycol, 1,4-tetramethylene glycol, 1,4-cyclohexanedimethanol or heptanemethylene glycol in a case of a glycol component, or isophthalic acid, 1,5-naphthalene dicarboxylic acid or adipic acid in a case of a dicarboxylic acid component, may, for example, be used as a substitution for a part of the monomer. Preferably, a polyethylene terephthalate type resin, that is, a polyethylene terephthalate resin having from 0.1 to 10 mol % of a 1,4-cyclohexane dimethanol component as a glycol component copolymerized, or a polyethylene terephthalate type resin having from 1 to 10 mol % of an isophthalic acid component as an acid component copolymerized, is preferably used in view of formability and transparency.

More preferred is a polyethylene terephthalate type resin, that is, a polyethylene terephthlate resin, having from 1 to 10 mol % of a 1,4-cyclohexane dimethanol component as a glycol component copolymerized, since it tends to be slowly crystallized and it has a good impact strength. A copolymerized product having a molar ratio higher than the above range is unfavorable since its crystallization is extremely slow, thus causing fusion or blocking phenomenon in extrusion step, drying step or recycling step, or decreasing physical properties of the formed product.

Further, one having an intrinsic viscosity measured at 30° C. when the polyethylene terephthalate type resin, that is, the polyethylene terephthalate resin, is dissolved in a mixed solvent of 1,1,4,4-tetrachloroethane and phenol (in a weight ratio of 60:40) (hereinafter referred to as IV value), within a range of from 0.6 dl/g to 1.0 dl/g, is preferably used. If it is less than 0.6 dl/g, the sheet or the formed product tends to have an insufficient mechanical strength and is likely to fracture, and if it exceeds 1.0 dl/g, the melt viscosity tends to be high and extrudability tends to be poor, and productivity tends to be poor, such being unfavorable.

The polycarbonate type resin, or more concisely, a polycarbonate resin, to be used in the present invention is one made mainly of bisphenol and produced by a phosgene method or an ester exchange method. The material bisphenol includes e.g. 2,2-bis-(4-hydroxyphenyl)propane (bisphenol A), 2,4-bis-(4-hydroxyphenyl)methyl-butane and 1,1-bis-(4-hydroxyphenyl)-cyclohexane. Further, it may be a homopolycarbonate, a copolycarbonate having a carboxylic acid copolymerized or a mixture thereof.

In the base layer, a method of blending the polyethylene terephthalate type resin with the polycarbonate type resin, that is a polyethylene terephthalate resin with a polycarbonate resin, is not particularly limited, and either of a method of directly introducing a stirred and mixed material into an extruder at the time of sheet forming, and a method of fusion-mixing a stirred and mixed material in a monoaxial or biaxial extruder to obtain pellets, and using them at the time of sheet extrusion, may be employed.

The constitutional ratio of the multilayer polyester sheet is preferably such that the proportion of the surface layer of the polycarbonate type resin laminated on the base is from 10 to 30% of the entire sheet. If it is less than 10%, the heat resistance tends to decrease, and if it exceeds 30%, post-formability tends to decrease, such being unfavorable economically. The thickness is suitably from 0.1 to 1.5 mm, more preferably from 0.2 to 1.0 mm.

A sheet comprising a base layer containing a polyethylene terephthalate type resin and a polycarbonate type resin, and a surface layer containing a polycarbonate type resin formed on at least one side of the base layer, wherein the base layer contains from 70 to 97 wt % of the polyethylene terephthalate type resin and from 3 to 30 wt % of the polycarbonate type resin based on the total amount of the polyethylene terephthalate type resin and the polycarbonate type resin, and the thickness of the surface layer is from 10 to 30% of the total thickness, which is an electrically conductive sheet further having a coating layer of an electrically conductive coating on at least one side of the surface layer, is suitably used for an electronic component packaging container. Here, the electrically conductive coating is a coating containing carbon black and/or an antistatic agent. The electrically conductive coating may further contain e.g. a resin content or a solvent. As the resin content, an acrylic type resin, a polyester type resin or a polyurethane type resin may, for example, be used. As the solvent, an ester type such as ethyl acetate or butyl acetate, an alcohol type such as methanol, ethanol or isopropyl alcohol, a hydrocarbon type such as toluene or xylene or a mixed solvent thereof, and in addition, water or a mixed solvent of water and an alcohol type may, for example, be used. Particularly when water or a mixed solvent of water and an alcohol type is used, decrease in sheet physical properties due to solvent at the time of coating can be suppressed.

The carbon black is not particularly limited, but one having an average particle size of less than 50 $\mu$m, a specific surface area of from 50 to 1,300 $m^2$/g and a DBP oil absorption of from 80 to 500 g/100 g is preferably used.

As the antistatic agent, a commercially available anionic antistatic agent, cationic antistatic agent, ampholytic antistatic agent or nonionic antistatic agent, and in addition, a metal type oxide such as $SnO_2$/Sb type, $In_2O_3$/Sn type or ZnO/AZ type, or an electrically conductive high polymer molecule such as polypyrrol, polythiophene or polyaniline, may, for example, be used, and use of a high polymer antistatic agent is preferred in a case where a particularly long-term antistatic effect is required. The high polymer antistatic agent may, for example, be a polyether type, a polyether ester amide type, a polyamide type or a siloxane type.

The content of each component in the electrically conductive coating is not particularly limited, but one having from 1 to 50 wt % of the resin content, from 1 to 20 wt % of the carbon black or the antistatic agent and from 35 to 90 wt % of the solvent may be used.

The electronic component packaging container of the present invention is obtained by firstly producing a multilayer polyester sheet having a base layer and a surface layer, followed by forming. As the method of producing the multilayer polyester sheet, it can easily be produced, for example, by coextrusion by means of a T-die method employing a multi-manifold method or a feed block method by plural conventional extruders. In such a case, the polycarbonate type resin layers constituting the base layer and the surface layer are strongly bonded to each other in a fused state, and accordingly they can easily be laminated without using an adhesive layer, but of course an adhesive may be used.

The coating layer can be obtained by coating the electrically conductive coating on at least one side of the surface layer, followed by drying. The coating method is not particularly limited and a known method may be employed. For example, a gravure coating method, a roll coating method, a dip coating method or a spray method may be mentioned. It is allowed to apply a corona discharge treatment or a primer treatment by means of another coating agent to the sheet coated surface as the case requires. It is preferred to adjust the coating amount and the thickness of the coating layer so that its surface specific resistance is within a range of from $10^4$ to $10^{14}$ Ω. No adequate protective properties of an electronic component against static electricity can be obtained if the surface specific resistance is beyond this range. The specific thickness varies depending upon the type of the electrically conductive coating, but is preferably within a range of from 0.5 to 10 $\mu$m. If it is less than 0.5 $\mu$m, no adequate electrical conductivity can be obtained after formed as an electronic component packaging container, and if it exceeds 10 $\mu$m, sheet properties such as formability tends to be greatly influenced.

For the multilayer polyester sheet, various additives may be incorporated into the base layer or the surface layer as the case requires. The additive may, for example, be a coloring agent, a pigment, a dye, an antistatic agent, an ultraviolet absorber, an energy extinction agent, a light dispersing agent, a fluorescent brightening agent, an antioxidant, a heat stabilizer, a slipping agent, an anti-block agent, a filler, a delustering agent or a fire retardant. Further, a known resin may be added to the base layer or the surface layer if its amount is small. As the polyethylene terephthalate type resin, a polycarbonate type resin and the electrically conductive coating, a commercially available one may be used. For the base layer, a selvage or a misroll of a main sheet generated at the time of sheet production or a pulverized product of a formed product may be recycled in an amount of from 5 to 50 wt %.

An antistatic treatment may be applied to the surface of the multilayer polyester sheet as the case requires. As the antistatic treatment method, various known methods may be employed such as a method of coating an antistatic agent and a method of laminating a resin having an antistatic agent incorporated thereinto. By applying the antistatic treatment to the surface, effects of preventing attachment or fling of a minute electronic component due to static electricity can be obtained when the sheet is used as a packaging container.

An electronic component packaging container having a free shape can be obtained from the above-described sheet by utilizing a known method of forming a sheet such as vacuum forming, air-pressure forming or pressing. This container is excellent in heat resistance, transparency and mechanical strength and is thereby used suitably as a carrier tape for packaging of particularly minute components (also called embossed carrier tape). The carrier tape is useful for packaging of an electronic component such as IC. The electronic component is stored in a pocket portion of the carrier tape, and the surface of the carrier tape is heat-sealed with a cover tape. As the cover tape, a commercially available one may be used as it is.

Now, the present invention will be explained in further detail with reference to Examples.

Evaluation Methods

Physical properties were measured as follows under an environmental condition of 23° C. in a humidity of 50% unless otherwise specified. Further, with respect to optical properties and impact strength, evaluation results in accordance with a standard in a sheet shape which is more common than a formed product are shown.

(1) Total Light Transmittance and Surface Cloudiness

A sample for measuring was cut out from a sheet and a formed product in each of Examples and Comparative Examples, and measurement was carried out in accordance with JIS K-7105 by means of a turbidimeter manufactured by Nippon Denshoku Industries Co., Ltd.

(2) Impact Strength

A sample was cut out from a sheet in each of Examples and Comparative Examples, and measurement was carried out by means of a Du Pont type impact tester manufactured by Toyo Seiki Seishaku-sho, LTD. by using a half inch hemispherical impact core and loads of 500 g and 1 kg at an environmental temperature of 23° C. The results are shown by a 50% impact fracture energy (unit: J) as defined in JIS-K7211.

(3) Post-Formability

A carrier tape having a width of 24 mm was prepared from a sheet of each of Examples and Comparative Examples by means of a carrier tape forming machine (manufactured by EDG) to evaluate the formability.

○: good

Δ: slightly poor

X: poor (4) Heat Resistance

A formed product formed from a sheet of each of Examples and Comparative Examples was subjected to a heat treatment at 90° C., 100° C. or 110° C. for 10 minutes by means of a fine oven DH62, manufactured by YAMATO, and the degree of deformation and change in transparency were visually observed and evaluated in accordance with the following evaluation standards.

○: no deformation

Δ: not deformed but whitened

X: deformed

EXAMPLE 1

As a material for a base, one having a polyethylene terephthalate (hereinafter referred to as PET) resin (PET 9921, manufactured by Eastman, IV value=0.80) and a polycarbonate (hereinafter referred to as PC) resin (Iupilon S-3000, manufactured by Mitsubishi Engineering-Plastics Corporation) blended in a proportion as identified in Table 1 and stirred and mixed was used, and as a material for a surface layer to be formed on the base, a PC resin was used, and they were dried so that the water content would be 50 ppm by means of humidifying driers PD-30DAM and P-50DS, respectively, manufactured by KAWATA MFG Co., Ltd.

Then, the material for both surface layers and the material for the base were simultaneously extruded by means of a 40 mm monoaxial extruder manufactured by CHIYODA SEIKI CO., LTD. and a 65 mm monoaxial extruder manufactured by CHIYODA SEIKI CO., LTD., respectively, at an extrusion temperature within a range of from 260 to 300° C. and the respective fused resins were combined by means of a two-types three-layers feed block manufactured by Sanwa Nuts Industries, Ltd. (thickness slit ratio 1:10:1) and extruded by a T-dies having a width of 700 mm to prepare a three-layer sheet having a thickness of 0.50 mm and a thickness ratio of the sheet of 1 (surface layer): 9 (base layer): 1 (surface layer) by quenching rolls.

EXAMPLES 2 AND 3 AND COMPARATIVE EXAMPLES 1 TO 4

A three-layer sheet was prepared in the same manner as in Example 1 except that the composition was changed as identified in Table 1.

Results of measurement of the total light transmittance, cloudiness and impact strength of these sheets are shown in Table 1. With respect to the total light transmittance and cloudiness, no significant change was observed until the content of the PC resin in the base became 30 parts by weight, but the cloudiness greatly increased when the content became higher than 30 parts by weight.

This sheet was formed by a carrier tape machine, and post-formability was evaluated, and the results are shown in table 1. The formability slightly decreased when the content of the PC resin in the base became higher than 30 parts by weight.

Further, the heat resistances of the formed products were compared and the results are shown in Table 2. The formed product became whitened and its transparency disappeared at 110° C. if the content of the PC resin in the base was less than 5 parts by weight, whereas when the content of the PC resin was at least 5 parts by weight, the formed product did not whiten.

COMPARATIVE EXAMPLES 5 AND 6

A PET resin and a PC resin were extruded from both two extruders of Example 1 to prepare single-layer sheets having a thickness of 0.5 mm. Evaluation was carried out in the same manner. The PET resin single-layer sheet has good transparency and post-formability but is significantly poor in impact strength at a low temperature and heat resistance. The PC resin single-layer sheet has good transparency, impact strength and heat resistance but is significantly poor in post-formability.

EXAMPLES 4 AND 5 AND COMPARATIVE EXAMPLES 7 AND 8

A sheet was prepared in the same manner as in each Example by using the same resin composition as in Example 2 (90 parts by weight of a PET resin and 10 parts by weight of a PC resin) as the base layer and 100 parts by weight of a PC resin as both surface layers with a sheet constitution ratio of three layers in two types as illustrated in Table 3. The post-formability of the sheet and the heat resistance of the formed product were evaluated and the results are shown in Table 3. When the both surface layers are higher than 30%, the post-formability decreases, when they are less than 10%, the heat resistance decreases, and when the both surface layers are 5%, deformation takes place at 110° C.

TABLE 1

| | | Examples | | | Comparative Examples | | | | | |
|---|---|---|---|---|---|---|---|---|---|---|
| | | 1 | 2 | 3 | 1 | 2 | 3 | 4 | 5 | 6 |
| Base layer | PC resin | 5 | 10 | 30 | 0 | 3 | 40 | 50 | 0 | 100 |
| | PET resin | 95 | 90 | 70 | 100 | 97 | 60 | 50 | 100 | 0 |
| Both surface layers | PC resin | 100 | 100 | 100 | 100 | 100 | 100 | 100 | — | — |
| Total light transmittance (%) | | 89 | 88.9 | 88.1 | 90 | 90 | 88.5 | 88.8 | 90 | 90.6 |
| Cloudiness (%) | | 2.2 | 2.6 | 6.1 | 1 | 1.2 | 15 | 22 | 1 | 1 |
| Du Pont impact strength (J) | | 1.96 | 1.91 | 2.18 | 1.96 | 1.95 | 2.15 | 2.16 | 1.84 | 2.4 |

TABLE 2

| | Examples | | | Comparative Examples | | | | | |
|---|---|---|---|---|---|---|---|---|---|
| | 1 | 2 | 3 | 1 | 2 | 3 | 4 | 5 | 6 |
| Post-formability | ○ | ○ | ○ | ○ | ○ | Δ | Δ | ○ | X |
| Heat resistance | | | | | | | | | |
| 90° C. | ○ | ○ | ○ | ○ | ○ | ○ | ○ | X | ○ |
| 100° C. | ○ | ○ | ○ | ○ | ○ | ○ | ○ | X | ○ |
| 110° C. | ○ | ○ | ○ | Δ | Δ | ○ | ○ | X | ○ |

TABLE 3

| | Examples | | Comparative Examples | | | |
|---|---|---|---|---|---|---|
| | 4 | 5 | 5 | 6 | 7 | 8 |
| Constitution ratio | | | | | | |
| Surface layer (wt %) | 5 | 15 | 0 | 0 | 2.5 | 20 |
| Base layer (wt %) | 90 | 70 | 100 | 0 | 95 | 60 |
| Surface layer (wt %) | 5 | 15 | 0 | 100 | 2.5 | 20 |
| Post-formability | ○ | ○ | ○ | X | ○ | X |
| Heat resistance | | | | | | |
| 90° C. | ○ | ○ | X | ○ | ○ | ○ |
| 100° C. | ○ | ○ | X | ○ | ○ | ○ |
| 110° C. | ○ | ○ | X | ○ | X | ○ |

EXAMPLE 6

An electrically conductive coating comprising 36 wt % of a methyl methacrylate-methacrylic acid ester copolymer, 4 wt % of carbon black (Balcan XC-72, manufactured by Cabot) and 60 wt % of an isopropyl alcohol/ethyl acetate mixed solvent (9/1) as a solvent was coated on both sides of the sheet of Example 1 by a gravure coating method, followed by drying to provide a coating layer having a thickness of 4 $\mu$m.

EXAMPLE 7

The same operation as in Example 6 was carried out except that an antistatic agent (Chemistat 3100, manufactured by SANYO KASEI CO., LTD.) was used instead of the carbon black.

The surface specific resistance and impact strength of the sheets of Examples 6 and 7 were measured. Further, each of these sheets was formed by a carrier tape machine, and the post-formability was evaluated. The results are shown in Table 4. Each sheet had good surface specific resistance, impact strength and formability.

TABLE 4

| | | Examples | |
|---|---|---|---|
| | | 6 | 7 |
| Base layer | PC resin | 5 | 5 |
| | PET resin | 95 | 95 |
| Both surface layers | PC resin | 100 | 100 |
| Surface specific resistance (Ω) | | $1 \times 10^4$ | $1 \times 10^{10}$ |
| DuPont impact strength (J) | | 1.90 | 1.87 |
| Post-formability | | ○ | ○ |

An IC was stored in the carrier tape of each Example and heat-sealed with a Thermofilm ALS (manufactured by Denki Kagaku Kogyo K.K.) as a commercially available cover tape. Since the carrier tapes of Examples 1 to 5 are excellent in transparency, it is possible to observe the state of the stored IC from the outside. The carrier tape having an IC stored therein and sealed with a cover tape was subjected to an automatic mounting apparatus. The cover tape was separated without trouble and the IC could be taken out without any problem. The carrier tape of the present invention showed good results as a packaging material for an electronic component such as IC.

INDUSTRIAL APPLICABILITY

An electronic component packaging container having a base layer comprising a polyethylene terephthalate type resin and a polycarbonate type resin and a surface layer comprising a polycarbonate type resin, is excellent in strength, heat resistance, formability, transparency and cloudiness and is useful as a carrier tape. Further, an electrically conductive sheet having a coating layer of an electrically conductive coating containing carbon black and/or an antistatic agent formed on at least one side of a multilayer polyester sheet having a base layer comprising a polyethylene terephthalate type resin and a polycarbonate type resin and a surface layer comprising a polycarbonate type resin formed on at least one side of the base layer, is excellent in strength, formability and antistatic properties, and is useful for an electrical component packaging container, particularly for a carrier tape.

What is claimed is:

1. A sheet which comprises a base layer containing a polyethylene terephthalate resin and a polycarbonate resin, a surface layer containing a polycarbonate resin formed on at least one side of the base layer, and a coating layer of an electrically conductive coating formed on at least one side of the surface layer, wherein the base layer contains from 70 to 95 wt % of the polyethylene terephthalate resin and from 5 to 30 wt % of the polycarbonate resin based on the total amount of the polyethylene terephthalate resin and the polycarbonate resin, the thickness of the surface layer is from 10 to 30% of the total thickness, and the coating layer has a surface specific resistance within a range of from $10^4$ to $10^{14}$ Ω.

2. An electronic component packaging container comprising a sheet according to claim 1, wherein the coating layer has a thickness of from 0.5 to 10 μm.

3. The sheet according to claim 1, wherein the electrically conductive coating contains carbon black and/or an antistatic agent.

4. The sheet according to claim 3, wherein the antistatic agent is a high polymer antistatic agent.

5. An electronic component packaging container which comprises the sheet as defined in claim 1 which has been embossed.

6. The electronic component packaging container according to claim 5, which is an embossed carrier tape.

7. A packaged product of an electronic component, wherein the electronic component is stored in the embossed carrier tape as defined in claim 6 and heat-sealed with a cover tape.

8. An electronic component packaging container, comprising a base layer containing a polyethylene terephthalate resin and a polycarbonate resin and a surface layer containing a polycarbonate resin, formed on at least one side of the base layer, wherein the base layer contains from 70 to 95 wt % of the polyethylene terephthalate resin and from 5 to 30 wt % of the polycarbonate resin based on the total amount of the polyethylene terephthalate resin and the polycarbonate resin, and the thickness of the surface layer is from 10 to 30% of the total thickness, which is an embossed carrier tape.

9. A packaged product of an electronic component, wherein the electronic component is stored in the carrier tape as defined in claim 8 and heat-sealed with a cover tape.

10. The electronic component packaging container according to claim 8, wherein the multilayer polyester sheet has a total light transmittance of at least 85% and a cloudiness of at most 10%.

11. The electronic component packaging container according to claim 8 which has an antistatic treatment applied to one or both sides.

* * * * *